United States Patent [19]
Suzuki et al.

[11] Patent Number: 5,793,135
[45] Date of Patent: Aug. 11, 1998

[54] FLAT TYPE BRUSHLESS MOTOR

[75] Inventors: Yuzuru Suzuki, Hamana-gun; Taketoshi Ohyashiki, Shizuoka, both of Japan

[73] Assignee: Minebea Co., Ltd., Kitasaku-gun, Japan

[21] Appl. No.: 852,036

[22] Filed: May 6, 1997

Related U.S. Application Data

[63] Continuation of Ser. No. 578,806, Dec. 26, 1995, abandoned.

[30] Foreign Application Priority Data

Dec. 27, 1994 [JP] Japan .................... 6-324289

[51] Int. Cl.$^6$ .................... H02K 7/08; H02K 7/14
[52] U.S. Cl. .................... 310/90; 310/67 R; 310/91; 384/133; 384/446; 360/98.07; 360/99.04; 360/99.08
[58] Field of Search .................... 310/90, 254, 268, 310/67 R; 384/108, 100, 114–120, 113, 286, 291, 292, 297; 360/98.07, 99.04, 99.08

[56] References Cited

U.S. PATENT DOCUMENTS

| | | | |
|---|---|---|---|
| 3,594,875 | 7/1971 | Sanow et al. | 24/214 |
| 3,746,407 | 7/1973 | Stiles et al. | 308/36.3 |
| 3,856,367 | 12/1974 | Wohnhaas et al. | 308/9 |
| 4,135,771 | 1/1979 | Hüber et al. | 308/9 |
| 4,181,867 | 1/1980 | Muller | 310/156 |
| 4,265,498 | 5/1981 | Luce et al. | 308/230 |
| 4,346,946 | 8/1982 | Maruyama | 308/9 |
| 4,523,800 | 6/1985 | Yamashita et al. | 350/6.7 |
| 4,797,009 | 1/1989 | Yamazaki | 384/100 |
| 5,148,338 | 9/1992 | Frugé | 360/98.07 |
| 5,200,866 | 4/1993 | Fruge et al. | 360/99.08 |
| 5,202,797 | 4/1993 | Kurosawa | 360/15 |
| 5,223,758 | 6/1993 | Kataoka et al. | 310/90 |
| 5,289,067 | 2/1994 | Tanaka et al. | 310/90.5 |
| 5,291,358 | 3/1994 | Takahashi | 360/99.08 |
| 5,323,076 | 6/1994 | Hajec | 310/90 |
| 5,328,272 | 7/1994 | Ainslie et al. | 384/112 |
| 5,370,463 | 12/1994 | Asada et al. | 384/113 |
| 5,430,590 | 7/1995 | Ainsüe et al. | 360/98.07 |
| 5,493,161 | 2/1996 | Uno et al. | 310/156 |
| 5,533,813 | 7/1996 | Makino et al. | 384/115 |

FOREIGN PATENT DOCUMENTS

| | | |
|---|---|---|
| 0251896A | 1/1988 | European Pat. Off. . |
| 2551576A | 3/1985 | France . |
| 3829563A1 | 3/1989 | Germany . |
| 63-121012A | 10/1988 | Japan . |
| 2266009 | 10/1993 | United Kingdom . |
| WO94/11873 | 5/1994 | WIPO . |

*Primary Examiner*—Steven L. Stephan
*Assistant Examiner*—Tran N. Nguyen
*Attorney, Agent, or Firm*—Staas & Halsey

[57] ABSTRACT

To provide a bearing structure of a flat type brushless motor for floppy disk drive in which a stator is arranged in a plane shape and a disk acting as a rotor yoke rotates along the plane shape without the use of conventional ball bearings so that the bearing structure can be high in the rigidity, stable in the motion, and low in the cost. For having a maximum bearing length, the bearing structure comprises a support shaft arranged with its axis extending depthwisely of the motor and having two journal regions provided on both ends thereof and a recessed region thereof between the two journal regions; and a rotor shaft mounted in the center of the disk and having a cylindrical body thereof onto which the journal regions of the support shaft are rotatably fitted. Accordingly, the motor will minimize the frictional loss of the sleeve bearing and increase its operational life. Also, the steadiness (of deflection, inclination, and rigidity) in bearing action will be enhanced. The support shaft is embedded at its lowermost end in the base plate which is a mounting base of the motor so that its vertical orientation with relation to the base plate is maintained with much ease, thus contributing to the physical accuracy of the bearing structure. The bearing structure according to the present invention employs non of the high-priced ball bearings of any conventional structure and will minimize the cost of the flat type brushless motor.

11 Claims, 6 Drawing Sheets

FLAT TYPE BRUSHLESS MOTOR

This application is a continuation of application Ser. No. 08/578,806, filed Dec. 26, 1995, now abandoned.

BACKGROUND OF THE INVENTION

1. Field of the Invention

The present invention relates to a bearing structure of a flat type brushless motor and more particularly, a bearing structure of a flat brushless motor for floppy disk drive.

2. Description of the Prior Art

Floppy disks are widely used as external storage means. Every microcomputer employs with a floppy disk drive for driving the floppy disks. While the down-sizing of microcomputers is being continuously demanded and a variety of laptop computers is now available, there have been developed flat types of motors for use in the floppy disk drives, which are as thin as or thinner than 10 mm.

For minimizing the thickness of the floppy disk drive motors, their bearing structure is decreased in overall size. FIG. 5 is a cross sectional view of a conventional floppy disk drive motor, in which a base plate 1 is made from a soft iron sheet. There are driving coils 3 on the base plate 1. Each driving coil 3 is wound up around each stator pole radially arranged from a rotary shaft 2. A bearing support 4 made from non-magnetic material is put in a support opening 5 arranged on a center of the base plate 1. The outer rims of two bearings 6 and 7 are vertically fitted in the center of the bearing support 4. Rotary shaft 2 is fixed into the inner rims of two bearings 6 and 7. Accordingly, the rotary shaft 2 is rotatably mounted by the two bearings 6 and 7 to the base plate 1. A disk shaped rotor 8 is fixedly mounted on the rotary shaft 2 for holding and rotating a floppy disk. The rotor 8 has a rotor magnet 9 mounted to the inner wall thereof opposite to the drive coils 3. Also, a speed detecting magnet 10 is mounted to the outer wall of the rotor 8 for detecting the rotational speed of the rotor 8.

FIG. 6 is a cross sectional view of another conventional floppy disk drive motor, in which like components are denoted by like numerals as of FIG. 5 and will no longer be explained. As shown in FIG. 6, a sleeve bearing 11 is accommodated in the support opening 5 of the base plate 1. The rotary shaft 2 is fitted at its lower end into the sleeve bearing 11 for rotating motion. The rotor 8 is mounted by a hub 12 to the rotary shaft 2. Also, a thrust bearing 13 is mounted between the hub 12 and the base plate 1.

The motor shown in FIG. 5 has a structure in which the two radial ball bearing 6 and 7 are vertically aligned on the rotary shaft 2 to run with pre-load for maintaining steadiness of the rotor 8 against deflection and inclination at accuracy, although the extension of the bearings 6 and 7 is minimized. In a structure of the motor shown in FIG. 6, the thrust ball bearing and the sleeve bearing sustain loads of the rotor 8 and the rotary shaft 2 respectively. Each of the conventional floppy disk drive motors includes substantially one or two ball bearings for supporting the rotary shaft 2 instead of only using one sleeve bearing made of an oil-occluded alloy material, thus being costly in the bearing structure.

It is an object of the present invention, in view of the above predicaments, to provide a bearing structure of a flat type brushless motor for floppy disk drive in which a stator is arranged in a planar shape and a rotor runs along the planar shape without the use of conventional ball bearings so that the bearing structure can be high in rigidity, stable in motion, and low in cost.

SUMMARY OF THE INVENTION

To maintain the same characteristic advantages as of a conventional ball-bearing structure and reduce the production cost of a flat type brushless motor in which a stator is arranged in a plane shape and a rotor runs along the plane shape, a sleeve bearing means is preferred and its bearing length is optimized. If the one or two ball bearings in the conventional motors shown in FIGS. 5 and 6 are substituted with a sleeve bearing, the bearing length is limited to 0.6 D (D being the diameter of a rotary shaft) guaranteeing no stable movements and increasing the frictioned loss. This will offset the characteristic advantages. A flat type brushless motor in which a stator is arranged in a plane shape and a rotor runs along the plane shape, according to the present invention, is provided, for having a maximum bearing length, comprising: a support shaft arranged with its axis extending depthwisely of the motor and having two journal regions provided on both ends thereof and a recess region thereof between the two journal regions; and a rotor shaft mounted in the center of the rotor 8 and having a cylindrical body thereof onto which the journal regions of the support shaft are rotatably fitted.

Accordingly, the bearing length is about 1.5 times greater than that of the conventional structure. Also, the rotor shaft is reduced in diameter to ½ thus decreasing the circumferential speed of the inner side of the bearing. This will minimize the frictional loss of the sleeve bearing and increase the operational life. Since L/D (L being the length of the support shaft) is as high as 1.8, the steadiness (of deflection, inclination, and rigidity) in bearing action will be enhanced. The support shaft is embedded at its lowermost end in the base plate which is a mounting base of the motor so that its vertical orientation with relation to the base plate is maintained with much ease, thus contributing to the physical accuracy of the bearing structure.

DESCRIPTION OF THE PREFERRED EMBODIMENTS

Figure 1:
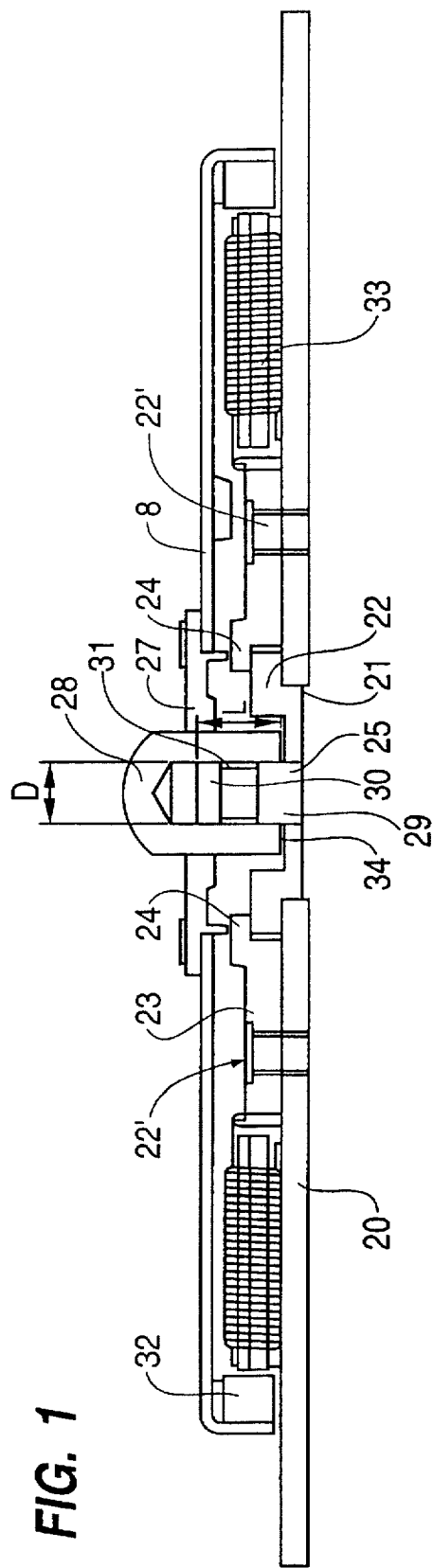
FIG. 1 is a cross sectional view showing a first embodiment of the present invention.

Embodiments of the present invention will be described referring to the accompanying drawings. FIG. 1 is a cross sectional view of a first embodiment of the present invention in the form of a floppy disk drive motor. As shown, a base plate 20 is substantially made of a soft iron sheet coated at both sides with insulating materials. A printed circuit is arranged on the upper side of the base plate 20 including electrical components for controlling the floppy disk drive motor. The motor of the present invention, i.e., a flat brushless motor, is furnished on the base plate 20. The base plate 20 has a support opening 21 provided in the center thereof. A housing 22 is fitted into the support opening 21 for holding a bearing structure which will be explained later in more details. The housing 22 is fixedly held by a flange 24 of a holding member 23 and tightened with retaining screws 22' to the base plate 20. A support shaft 25 is vertically mounted on the housing 22 so that its proximal end is embedded in the housing 22. The support shaft 25 is oriented with its axis extending depthwisely of the motor.

The support shaft 25 has two journal regions 29 and 30 provided on the lower and upper ends thereof, respectively, and the outer diameter D of the journal regions 29 and 30 is substantially identical to the inner diameter of a rotor shaft 28 on which a hub 27 carrying a rotor 8 is fixedly mounted. Also, a recessed region 31 of which diameter is smaller than the diameter D is provided between the two journal regions 29 and 30 of the support shaft 25. It should be noted that $L \leq 1.5\ D$ is satisfied if the maximum span length of an interface is L between the two journal regions 29, 30 of the support shaft 25 and the cylinder of the rotor shaft 28. The length of the recessed region 31 is preferably more than ⅓ of the maximum span length L. When those requirements are met, the frictional loss is minimized ensuring stable rotating motions of a rotor 8. The interface between the journal regions 29, 30 of the support shaft 25 and the rotor shaft 28 is designated as bearings.

The rotor 8 is rotatably mounted about the support shaft 25 and has a circle of drive magnets 32 mounted to the inner wall thereof. A group of drive coils 33 is mounted radially and outwardly on the holding member 23 secured to the base plate 20 with the retaining screws 22'. The distal ends of magnetic poles generated by the drive coils 33 are located opposite to and spaced by a gap from the inner side of the drive magnets 32. A thrust load created by the rotor shaft 28 carrying the rotor 8 and the hub 27 in motion is sustained by a washer 34 mounted between the lower side of the rotor shaft 28 and the upper side of the housing 22. Grease is applied to between the inner side of the rotor shaft 28 and the journal regions 29, 30 of the support shaft 25 and to the washer 34 and the recessed region 31 of the support shaft 25. In this embodiment, a region of the housing 22 on which the washer 34 is seated directly may be coated with a thin layer of fluorine resin for attenuating the frictional loss. It is also possible to have a spiral groove in the journal regions 29 and 30 of the support shaft 25 or the cylinder of the rotor shaft 28. This allows decreases in the contact area of the interface as well as in the frictional loss due to a flow of lubricant along the groove.

Figure 2:
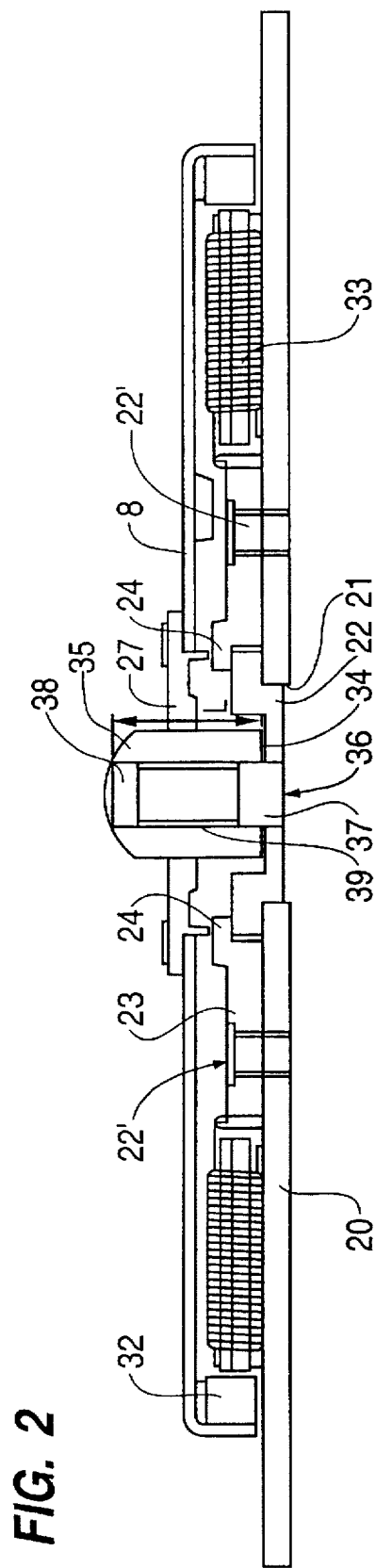
FIG. 2 is a cross sectional view showing a second embodiment of the present invention.

FIG. 2 is a cross sectional view of a second embodiment of the present invention, in which like components are denoted by like numerals as of the first embodiment and will no longer be explained in detail. As shown in FIG. 2, a rotor shaft 35 holding a hub 27 has a cylindrical shape, and a support shaft 36 is mounted on a housing 22 so as to extend vertically from bottom to top throughout the cylindrical rotor shaft 35. Accordingly, two journal regions 37 and 38 of the support shaft 36 are greater in area than those of the first embodiment, providing more steadiness (of deflection, inclination, and rigidity) in the bearing action. Also, a recessed region 39 is provided on the support shaft 36.

Figure 3:
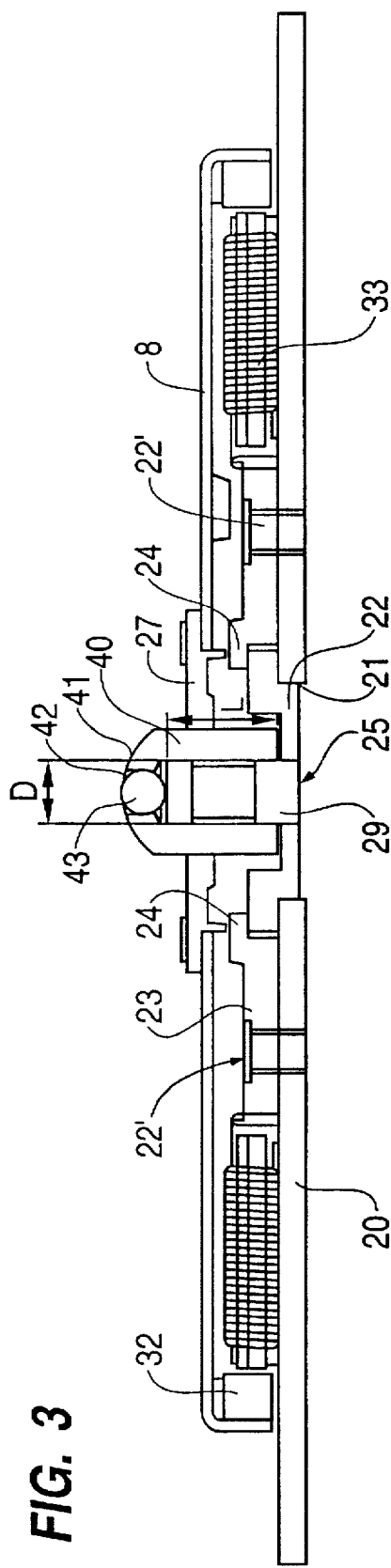
FIG. 3 is a cross sectional view showing a third embodiment of the present invention.

FIG. 3 is a cross sectional view of a third embodiment of the present invention, in which like components are denoted by like numerals as of the first embodiment, similar to the second embodiment, and will no longer be explained in details. As shown in FIG. 3, a rotor shaft 40 holding a hub 27 has a through hole 42 provided in the top thereof. A ball 43 is press fitted from above into the through hole 42 of the rotor shaft 40 so that it comes in direct contact with the upper end of a support shaft 25. Hence, the ball 43 accepts a thrust load from a rotor 8 acting as a rotor yoke while the lower end of the support shaft 25 remains not in direct contact with the housing 22. During press fitting of the ball 43 into the through aperture 42, the hub 27 or a rotor 8 acting as a yoke may be located to a desired position by controlling a pressing depth.

Figure 4:
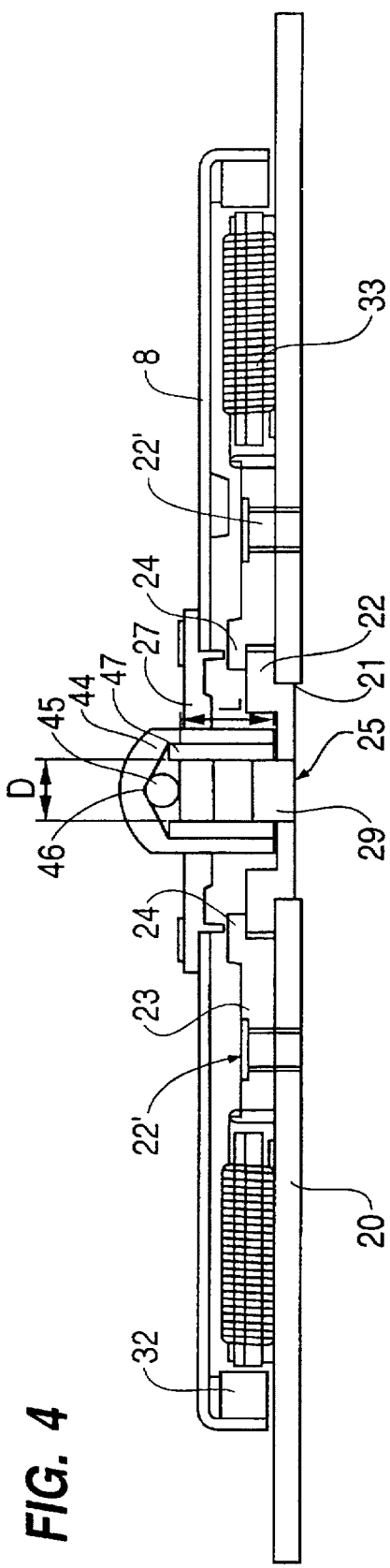
FIG. 4 is a cross sectional view showing a fourth embodiment of the present invention.
Figure 5:
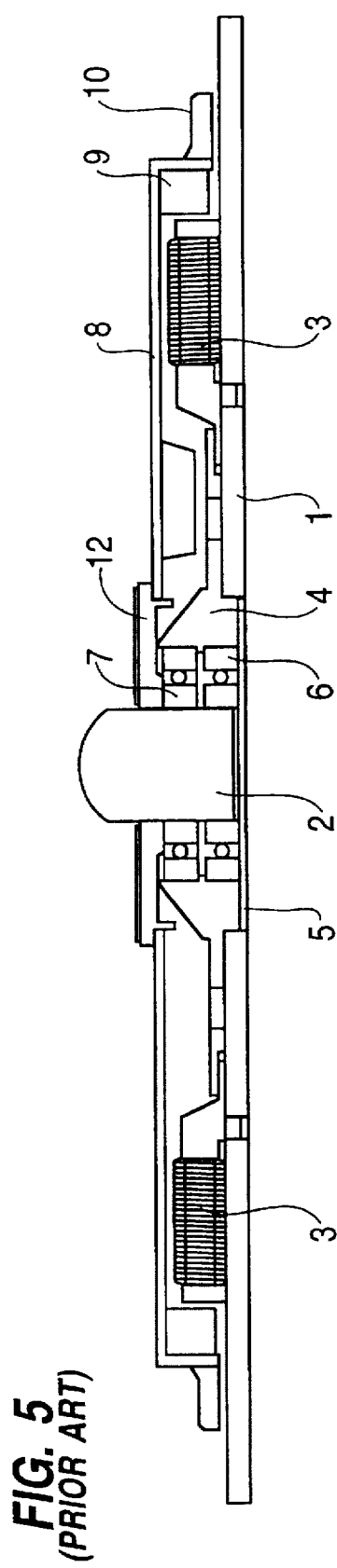
FIG. 5 is a cross sectional view showing a prior art structure.
Figure 6:
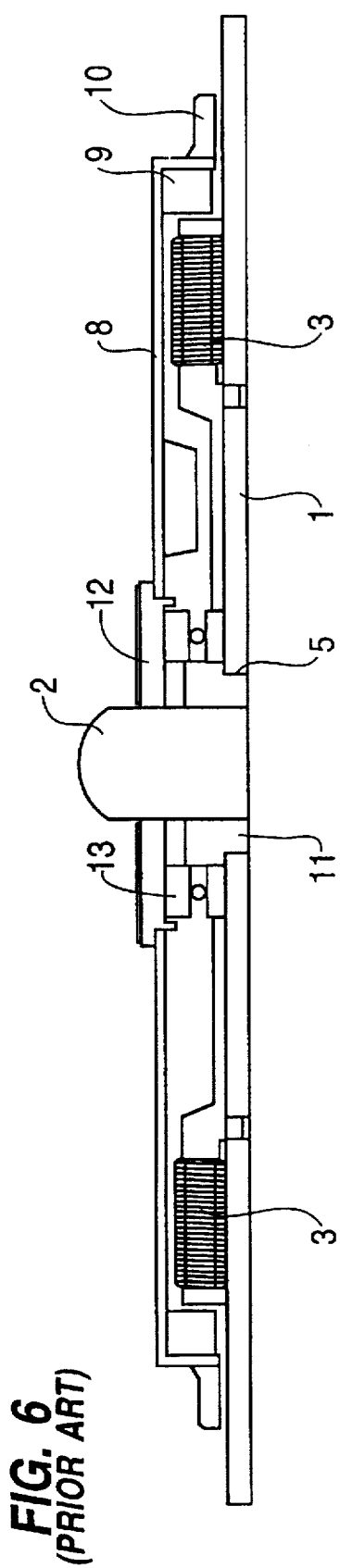
FIG. 6 is a cross sectional view showing another prior art structure.

FIG. 4 is a cross sectional view of a fourth embodiment of the present invention, in which like components are denoted by like numerals as of the first embodiment, similar to the second and third embodiments, and will no longer be explained in detail. As shown in FIG. 4, a rotor shaft 44 holding a hub 27 has a doomed top which is substantially similar in the structure to that of the first embodiment. In the fourth embodiment, a ball 45 is mounted between the inner side 46, at the top, of the rotor shaft 44 and the upper end of a support shaft 25. An oil-occluded metal 47 is embedded between a contact surface of the rotor shaft 44 and the support shaft 25. While the ball 45 accepts a thrust load from a rotor 8 acting as a rotor shaft 44, the lower end of the rotor shaft 40 is barely spaced from a housing 22.

As the embodiments of the present invention have been described, various changes and modifications can be made without departing the scope of the present invention defined in claims of this specification.

As set forth above, the flat type brushless motor in which a stator is arranged in a planar shape and a disk acting as a rotor 8 rotates along the plane shape, comprises a support shaft arranged with its axis extending depthwisely of the motor and having two journal regions provided on both ends thereof and a recessed region thereof between the two journal regions; and a rotor shaft mounted in the center of the rotor and having a cylindrical body thereof onto which the journal regions of the support shaft are rotatably fitted. Accordingly, the motor will minimize the frictional loss of the sleeve bearing and increase its operational life. Simultaneously, the steadiness (of deflection, inclination, and rigidity) in the bearing action will be enhanced. The support shaft is embedded at its lowermost end in the base plate which is a mounting base of the motor so that its vertical orientation with relation to the base plate is maintained with much ease, thus contributing to the physical accuracy of the bearing structure. The bearing structure of the present invention employs none of the high-priced ball bearings of any conventional structure and will minimize the cost of the flat type brushless motor.

What is claimed is:

1. A flat type brushless motor in which a stator is disposed in a planar shape and a disk acting as a rotor rotates along the planar shape, comprising:

a support shaft disposed with its axis extending depthwisely of the motor and having two journal regions provided on both ends thereof integrally fixed thereto and a recessed region thereof between the two journal regions; and a rotor shaft, mounted in the center of the disk and having a cylindrical body, is rotatable fitted to said two journal regions, wherein the two journal regions are integrally and fixedly connected to said rotor shaft, wherein a relationship between the outer diameter D of said journal regions and the maximum span length L of an interface portion between the support shaft and the cylindrical body satisfies the condition:

$$L \leq 1.5\ D, \text{ and}$$

wherein the recessed region has a length of at least more than L/3.

2. A flat type brushless motor according to claim 1, wherein the cylindrical body of the rotor shaft is hollow having openings at both ends.

3. A flat type brushless motor according to claim 1, wherein the cylindrical body of the rotor shaft has a doomed top thereof and a ball is disposed between the inner wall of the top of the rotor shaft and the upper end of the support shaft for accepting a thrust.

4. A flat type brushless motor according to claim 3, wherein the ball is press fitted into an aperture provided in the doomed top of the rotor shaft for determining its relative location.

5. A flat type brushless motor according to claim 4, wherein a location of the ball is determined so that the disk rotates at its optimum position.

6. A flat type brushless motor according to claim 1, wherein an interface between the rotor shaft and a base plate of the motor serves as a thrust bearing means.

7. A flat type brushless motor according to claim 6, wherein the thrust bearing means is furnished with a fluorine resin material.

8. A flat type brushless motor according to claim 7, wherein the fluorine resin material is provided in the form of a thin coating over at least either of the rotor shaft or the base plate.

9. A flat type brushless motor according to claim 1, wherein the journal regions of the support shaft or the cylindrical body of the rotor shaft has a spiral groove provided in the contact surface thereof.

10. A flat type brushless motor according to claim 1, wherein the support shaft is embedded at its distal end in a housing secured to a base plate or a mounting base.

11. A flat type brushless motor according to claim 1, wherein a contact surface of the rotor shaft which runs directly on the support shaft is furnished with an embedded oil-occluded metal alloy.

\* \* \* \* \*